Feb. 10, 1925.
W. R. DONALDSON
QUICK DETACHABLE CONNECTION FOR TIRE VALVE STEMS
Original Filed March 18, 1922
1,525,573
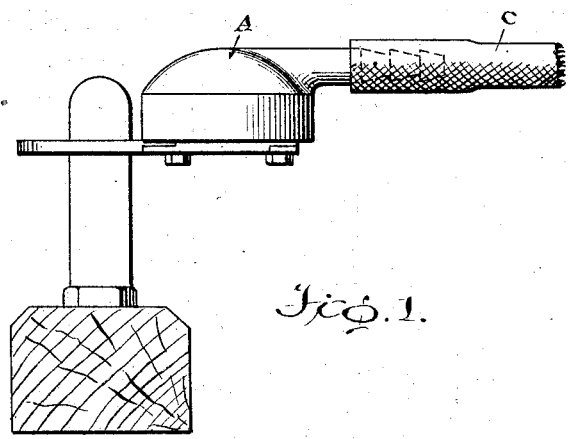
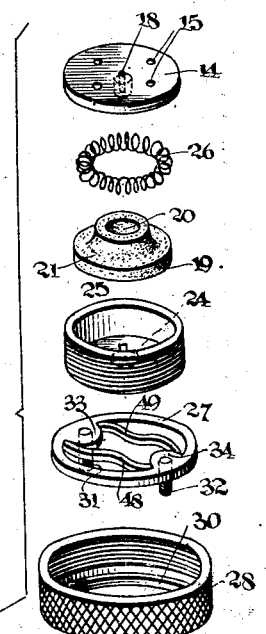
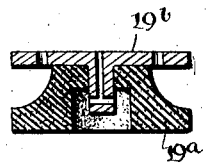
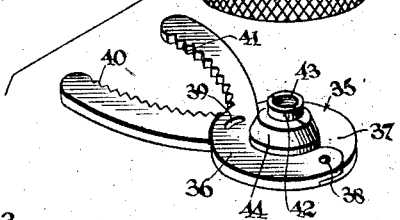
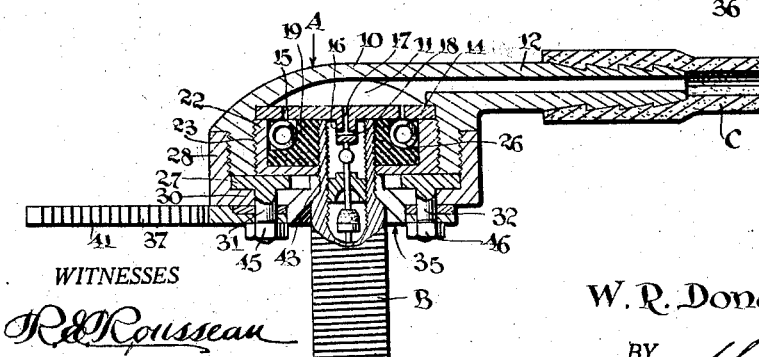
WITNESSES
INVENTOR
W. R. Donaldson,
BY
ATTORNEYS Patented Feb. 10, 1925.

1,525,573

UNITED STATES PATENT OFFICE.

WALTER RICHARD DONALDSON, OF PHOENIX, ARIZONA.

QUICK-DETACHABLE CONNECTION FOR TIRE-VALVE STEMS.

Original application filed March 18, 1922, Serial No. 544,796. Divided and this application filed March 7, 1923. Serial No. 623,477.

*To all whom it may concern:*

Be it known that I, WALTER R. DONALDSON, a citizen of the United States, and a resident of Phoenix, in the county of Maricopa and State of Arizona, have invented certain new and useful Improvements in Quick-Detachable Connections for Tire-Valve Stems, of which the following is a specification.

This invention relates to a quick detachable connection for use in the inflating of pneumatic tires or the like, and this application forms a division of my application for automatic inflating valves and pressure gauges, filed March 18, 1922, Serial No. 544,796 which has matured into Patent No. 1,495,679, patented May 27, 1924.

The object of the invention is to provide a quick detachable connection which may be readily and securely although releasably associated with the valve stem of a pneumatic tire and this irrespective of the type of wheel upon which the tire is mounted, the quick detachable tire valve connection being organized and adapted to carry out its functions not only with the light type of artillery or wooden wheels having relatively great clearance or working space but also with the heavy type of wheels used on the rear end of heavy cars as well as with wire wheels or disk wheels.

A further object is to provide a quick detachable connection of this character having means for facilitating the removal of the dust cap of the tire and valve stem without necessitating the use of pliers or the like.

Other objects and advantages of the invention consists of certain novel features of the construction, combination and arrangement of parts which will be hereinafter more fully described and particularly pointed out in the appended claims, reference being had to the accompanying drawings forming part of this specification, and in which:

Figure 1 is a view in side elevation, illustrating the preferred embodiment of the invention;

Figure 2 is a group view in perspective, showing the parts of the tire valve connection, except the casing immediately prior to assembly;

Figure 3 is a view of the assembly in central longitudinal vertical section; and Figure 4 is a detail view in section, showing a modified form of packing or coupling washer.

Referring to the drawings wherein for the sake of illustration is shown the preferred embodiment of the invention, the automatic tire valve connection is designated generally at A and is adapted to be associated with the tire valve stem B of a pneumatic tire in the manner shown in Figure 3 and by means of a flexible pipe C is adapted to be connected with a combined gauge and distributing valve forming the subject-matter of my application, filed March 18, 1922, Serial No. 544,796.

The automatic tire valve connection includes a casing 10 chambered, as at 11, and having a stem 12 affording communication between the chamber of the casing and the pipe C. The chamber 11 of the casing 10 is machined to provide a shoulder against which a ported plate or disk 14 is seated, the ported plate 14 having ports 15 intermediate the center of the disk and the periphery thereof. A boss 16 is integrally formed with the plate 14 at the center thereof and in the assembly the boss depends from the plate 14 as shown in Figure 3, and the boss and the plate are provided with ports 17 and 18, the port 17 extending transversely of the boss and the port 18 extending longitudinally of the boss and through the plate and communicating with the port 17. A packing or coupling washer 19 is arranged next to the plate 24 and is formed with an axial opening 20 and is also cutaway around its upper marginal edge, as at 21. This washer 19 is supported in position by means of a retaining cup 22 having threaded engagement, as at 23, with the casing 10 and engaging the washer 19 and forcing it against the plate 14. The base of the retaining cup is provided with an axial opening 24 and diametrically opposite slots 25, the opening admitting of the passage of the valve stem of the tire valve and the slots 25 facilitating the engagement of a screw driver or other suitable tool with the retaining cup to assemble and disassemble it. The arrangement is such that the boss 16 is arranged axially of the opening 20 of the washer 19 and the ports 15 of the plate 14 overlie the cutaway portion 21 of the washer so that the pressure may flow through these ports and be active to urge the washer into operative engagement with the tire valve, as shown in Figure 3. This pressure is usually effective to efficiently accomplish packing or sealing engagement between the washer and the stem of the tire valve but if desired an endless coil spring 26 may be employed, the coil spring being received in the space provided by cutting away the washer and supplementing the action of the pressure. It is to be understood however that this coil spring 26 may be dispensed with when desired, leaving the pressure alone to carry out this function.

A rotatable carrier 27 is provided and comprises a ring or annular plate supported for rotary motion by means of the cap or ferrule 28 having a body portion 29 threaded onto the casing 10 and having a flange 30 engaging the underside of the carrier 27. Studs 31 and 32 depend from ears 33 and 34 provided upon the carrier and upon these studs a chuck or coupling designated generally at 35 is supported. The chuck or coupling 35 comprises a pair of pivoted levers 36 and 37, respectively, the lever being crossed and being pivotally connected at one end, as at 38, by means of the stud 32, the levers having sliding connection at the point of their cross by means of a pin and slot arrangement constituted by slots 39 formed in the levers and the stud 31 which performs the function of the pin. The arms or portions of the levers beyond the sliding connection 39 constitute handles and have their confronting faces serrated or toothed, as indicated at 40 and 41. The levers 36 and 37 carry jaws 42 and 43, respectively, the jaws being integrally formed or rigidly connected with the levers and having their faces threaded so that the threads of their faces may mesh with the threads of the tire valve stem, as indicated in Figure 3 so as to securely lock the automatic valve connection to the valve stem of the tire valve. Between the jaws 42 and 43 and the levers there is provided an inclined and smooth guiding portion 44, as clearly shown in Figures 3 and 6. Nuts 45 and 46 are threaded on the lower end of the studs 31 and 32 and prevent the chuck from falling therefrom. Springs 48 and 49 are mounted upon the carrier 27, as clearly shown in Figure 2, and these springs engage the periphery of the jaws 42 and 43 in the assembly and urge these jaws toward each other.

As shown in Figures 1 and 2, the portions of the levers 35 and 36 which carry the toothed or serrated portions 40 and 41 are adapted to be used to remove the dust cap E of the tire valve, as clearly shown in Figures 1 and 2. After the dust cap has been removed, the arms or portions of these levers 35 and 36 upon which the jaw faces 40 and 41 are formed, and which constitute handle members, are grasped so as to swing the jaws 42 and 43 of the chuck away from each other thus permitting these jaws to be slipped down over the valve stem of the tire valve B. This valve stem also readily enters the opening 20 of the washer 19 since the pressure is not active against the washer at this time. When the inflating valve is properly positioned on the tire valve stem the levers 35 and 36 are released and the springs 48 and 49 urge the jaws 42 and 43 into engagement with the valve stem so that the threads of the jaws mesh with the treads of the valve stem. At this time the lower end of the boss 16 engages the stem or pin of the valve and depresses it to open the tire valve automatically. It is to be noted that as the chuck 35 is swiveled on the casing it may be turned to any position which may be convenient and which may facilitate the association of the inflating valve and the tire valve.

In lieu of constructing the packing or coupling washer 19 of the quick detachable connection after the manner shown in Figures 2 and 3, this washer may be constructed as shown in Figure 4. As shown in Figure 7, the packing or coupling washer is designated at 19$^a$ and includes an inwardly extending lip 19$^b$ adapted to be engaged by the top edge of the tire valve stem and pressed or urged against the plate 14 to insure more efficient packing action by the washer.

With this connection practically instantaneous coupling of the valve stem of a pneumatic tire may be had and the coupling or connection will be fluid-tight and effective since not only mechanical connection with the threads is had but the packing washer being pressed against the upper end of the valve stem will effect a fluid-tight fit. Moreover when the connection is positioned on the valve stem it automatically opens the valve mechanically thus relieving the pressure of this duty. As soon as the filling operation is completed the connection may at once be taken from the valve stem by gripping the handles of the levers 36 and 37 and lifting the connection from the valve stem.

I claim:

1. A quick detachable connection for use with the valve stem of a tire valve including a casing having means for opening the tire valve and packing means engageable with the valve stem and adapted to be urged into operative packing engagement with the valve stem by the fluid pressure, a carrier swiveled on the casing and a chuck supported on the carrier and having movable jaws provided with threads engageable with the valve stem.

2. In a device of the character described, a quick detachable connection for the valve stem of the tire valve comprising a casing, a plate fitted into said casing and having ports intermediate its center and its periphery, said plate having a depending boss adapted to operate the valve stem and having ports therein leading to said plate, a rubber washer arranged in said casing against said plate and having a central opening and having its upper and outer marginal edges cut away, the space defined by said cutaway portion being disposed below said ports whereby the pressure is effective to urge said rubber washer into packing engagement with the valve stem, a retaining cup for said washer having threaded connection with the casing and engaging the plate to retain it in position, a cap having threaded connection with said casing, a rotatable ring carrier supported upon said cap and having depending studs, a chuck including a pair of crossed levers pivotally supported upon one of said studs, said crossed levers having slots therein coacting with the other of said studs to provide a pin and slot connection therewith, said chuck having jaws carried upon said levers and provided with threads engageable with the threads of the valve stem, the levers having portions constituting handles, nuts threaded upon the lower ends of said studs for retaining the chuck thereon, and springs for closing said jaws arranged upon the rotatable carrier.

3. In a device of the character described, a quick detachable connection for the valve stem of the tire valve comprising a casing, a plate fitted into said casing and having ports intermediate its center and its periphery, said plate having a depending boss adapted to operate the valve stem and having ports therein leading to said plate, a rubber washer arranged in said casing against said plate and having a central opening and having its upper and outer marginal edge cut away, the space defined by said cutaway portion being disposed below said ports whereby the pressure is effective to urge said rubber washer into packing engagement with the valve stem, a retaining cup for said washer having threaded connection with the casing and engaging the plate to retain it in position, a cap having threaded connection with said casing, a rotatable ring carrier supported upon said cap and having depending studs, a chuck including a pair of crossed levers pivotally supported upon one of said studs, said crossed levers having slots therein coacting with the other of said studs to provide a pin and slot connection therewith, said chuck having jaws carried upon said levers and provided with threads engageable with the threads of the valve stem, nuts threaded upon the lower ends of said studs for retaining the chuck thereon, and springs for closing said jaws arranged upon the rotatable carrier.

4. In a device of the character described, a quick detachable connection for the valve stem of a tire valve comprising a casing, a plate fitted in said casing and having a depending boss adapted to operate the valve stem and having ports therein, a cap having threaded connection with said casing, a rotatable ring carrier supported by said cap and having depending studs, a chuck including a pair of crossed levers supported upon said studs and having jaws provided with threads engageable with the threads of the valve stem, and springs for closing said jaws arranged upon said rotatable carrier.

5. A device of the character described, a quick detachable connection for the valve stem of a tire valve including a casing, a packing washer of rubber in said casing and arranged to be urged into packing engagement with the tire valve by pressure of the fluid, and a chuck carried by said casing and having jaws provided with threads engageable with the threads of the valve stem, said chuck having crossed handles.

6. In a device of the character described, a quick detachable connection for the valve stem of the tire valve comprising a casing, a ported plate in said casing, a washer associated with the plate and having an inwardly extending lip lying against the plate and adapted to be engaged by the end of the valve stem whereby the washer is urged into packing engagement with the plate, and a chuck attached to the casing and engageable with the valve stem.

WALTER RICHARD DONALDSON.